US012581308B1

(12) United States Patent
Indiradevi

(10) Patent No.: US 12,581,308 B1
(45) Date of Patent: Mar. 17, 2026

(54) PENETRATION TESTING OF CELLULAR NETWORK ENVIRONMENTS

(71) Applicant: Trend Micro Incorporated, Yoyogi (JP)

(72) Inventor: Salim SreeNarayanaPillai Indiradevi, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 385 days.

(21) Appl. No.: 18/469,359

(22) Filed: Sep. 18, 2023

(51) Int. Cl.
*H04W 12/122* (2021.01)
*H04W 12/71* (2021.01)
*H04W 24/06* (2009.01)

(52) U.S. Cl.
CPC ......... *H04W 12/122* (2021.01); *H04W 12/71* (2021.01); *H04W 24/06* (2013.01)

(58) Field of Classification Search
CPC ... H04W 12/122; H04W 12/71; H04W 24/06; H04L 63/0236; H04L 63/14
See application file for complete search history.

(56) References Cited

U.S. PATENT DOCUMENTS

| | | | | |
|---|---|---|---|---|
| 2010/0138921 | A1* | 6/2010 | Na | H04L 63/1458 726/22 |
| 2017/0366577 | A1* | 12/2017 | Shapira | H04L 63/1458 |
| 2020/0128026 | A1* | 4/2020 | Shimanaka | G06F 21/566 |
| 2020/0314655 | A1* | 10/2020 | Jain | H04L 63/0236 |
| 2021/0258334 | A1* | 8/2021 | Sayag | H04L 63/1425 |
| 2024/0022898 | A1* | 1/2024 | Ryu | H04W 8/005 |

OTHER PUBLICATIONS

"Exploring the 3GPP UPF—User Plane Function", Emblasoft, Jul. 20, 2022, Downloaded Aug. 31, 2023. https://emblasoft.com/blog/exploring-the-3gpp-upf-user-plane-function#:~:text=The%20UPF%20represents%20the%20data,the%20edge%20of%20the%20network.
"Metasploit", Wikipedia, Downloaded Sep. 5, 2023, https://en.wikipedia.org/wiki/Metasploit.
Salim S.I. "Outside Looking In: How a Pack Reflection Vulnerability Could Allow Attackers to Infiltrate Internal 5G Networks", Trend Micro Research, Downloaded Sep. 13, 2023, https://documents.trendmicro.com/assets/white_papers/Outside-Looking-In-How-a-Packet-Reflection-Vulnerability-Could-Allow-Attackers-to-Infiltrate-Internal-5G-Networks.pdf.
"Threats to Packet Core Security of 4G Network", Positive Technologies, 2017, Downloaded Sep. 13, 2023, https://www.gsma.com/get-involved/gsma-membership/wp-content/uploads/2017/09/Positive-Technologies-White-Paper.pdf.

(Continued)

*Primary Examiner* — Margaret G Webb
(74) *Attorney, Agent, or Firm* — Beyer Law Group LLP

(57) ABSTRACT

Penetration testing is performed on a cellular network environment. An attacker system sends a request packet to a target user equipment that is connected to a base station of a cellular network. A source Internet Protocol (IP) address of the request packet is changed to an IP address that allows a response packet from the target user equipment to be received at a relay system. The request packet is encapsulated in a General Packet Radio Services Tunneling Protocol User (GTP-U) tunnel packet that is sent to a UPF of the cellular network. The response packet, which is responsive to the request packet, is received at the relay system by way of the UPF. A destination IP address of the response packet is changed to an IP address of the attacker system before forwarding the response packet to the attacker system.

17 Claims, 9 Drawing Sheets

(56) References Cited

OTHER PUBLICATIONS

"Stream Control Transmission Protocol", Wikipedia, Downloaded Sep. 5, 2023, https://en.wikipedia.org/wiki/Stream_Control_Transmission_Protocol.

"LTE; Security Assurance Specification (SCAS) Threats and Critical Assets in 3GPP Network Product Classes (3GPP TR 33.926 version 15.1.0 Release 15)", ETSI, 2018, Downloaded Sep. 14, 2023, https://www.etsi.org/deliver/etsi_tr/133900_133999/133926/15.01.00_60/tr_133926v150100p.pdf.

Lin et al., "Attacks From 4G/5G, Core Networks Risks of the Industrial IoT in Compromised Campus Networks", Trend Micro Research, Downloaded Sep. 13, 2023, https://documents.trendmicro.com/assets/white_papers/wp-attacks-from-4G-5G-core-networks.pdf.

* cited by examiner

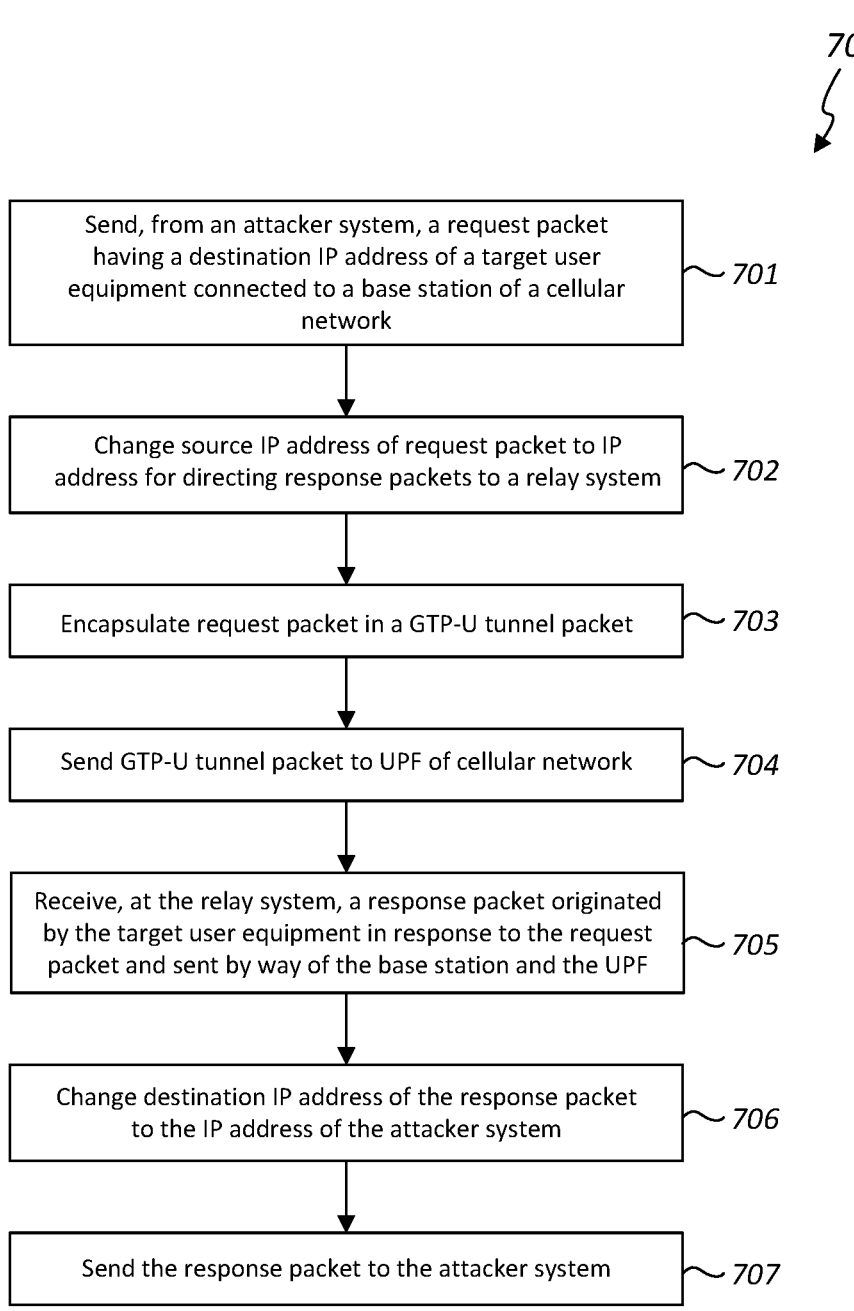

700

Send, from an attacker system, a request packet having a destination IP address of a target user equipment connected to a base station of a cellular network ~701

Change source IP address of request packet to IP address for directing response packets to a relay system ~702

Encapsulate request packet in a GTP-U tunnel packet ~703

Send GTP-U tunnel packet to UPF of cellular network ~704

Receive, at the relay system, a response packet originated by the target user equipment in response to the request packet and sent by way of the base station and the UPF ~705

Change destination IP address of the response packet to the IP address of the attacker system ~706

Send the response packet to the attacker system ~707

FIG. 8

PENETRATION TESTING OF CELLULAR NETWORK ENVIRONMENTS

TECHNICAL FIELD

The present disclosure is directed to cellular networks.

BACKGROUND

Cellular networks, such as 5G networks, are deployed by commercial network operators as well as organizations. For example, a consumer may subscribe to a commercial network operator to obtain cellular network connectivity for his or her smartphone. As another example, an organization may operate a private cellular network in a factory to interconnect industrial devices. A cellular network and a plurality of target user equipment connected to the cellular network by a base station and a packet core are also referred to herein as a "cellular network environment."

Just like other communication networks, cellular network environments are susceptible to network attacks, such as unauthorized intrusion, unauthorized routing, etc. More particularly, it has been demonstrated that General Packet Radio Services Tunneling Protocol (GTP) messages may be injected into a GTP user (GTP-U) tunnel by prediction or brute forcing of the Tunnel Endpoint Identifier (TEID). There are also known ways of injecting User Datagram Protocol (UDP) and Internet Control Message Protocol (ICMP) packets into GTP-U tunnels. It has also been demonstrated that arbitrary packets may be sent to a user equipment of a 5G network from a spoofed source and that arbitrary packets may be sent on any destination on behalf of a user equipment.

Penetration testing involves intentionally using various malicious techniques to evaluate the security of a cellular network environment. Some security vendors, such as the SecurityGen company, commercially-offer cellular network penetration testing services. It is important to perform penetration testing on cellular networks environments to identify and mitigate vulnerabilities.

BRIEF SUMMARY

Penetration testing is performed on a cellular network environment. In one embodiment, an attacker system sends a request packet to a target user equipment that is connected to a base station of a cellular network. A source Internet Protocol (IP) address of the request packet is changed to an IP address that allows a response packet from the target user equipment to be received at a relay system. The request packet is encapsulated in a General Packet Radio Services Tunneling Protocol User (GTP-U) tunnel packet that is sent to a UPF of the cellular network. The response packet, which is responsive to the request packet, is received at the relay system by way of the UPF. The relay system may receive the response packet directly from the UPF, or from a remote relay that receives the response packet from the UPF and forwards the response packet to the relay system. A destination IP address of the response packet is changed to an IP address of the attacker system before forwarding the response packet to the attacker system.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 8 shows a flow diagram of a method of penetration testing a cellular network environment, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
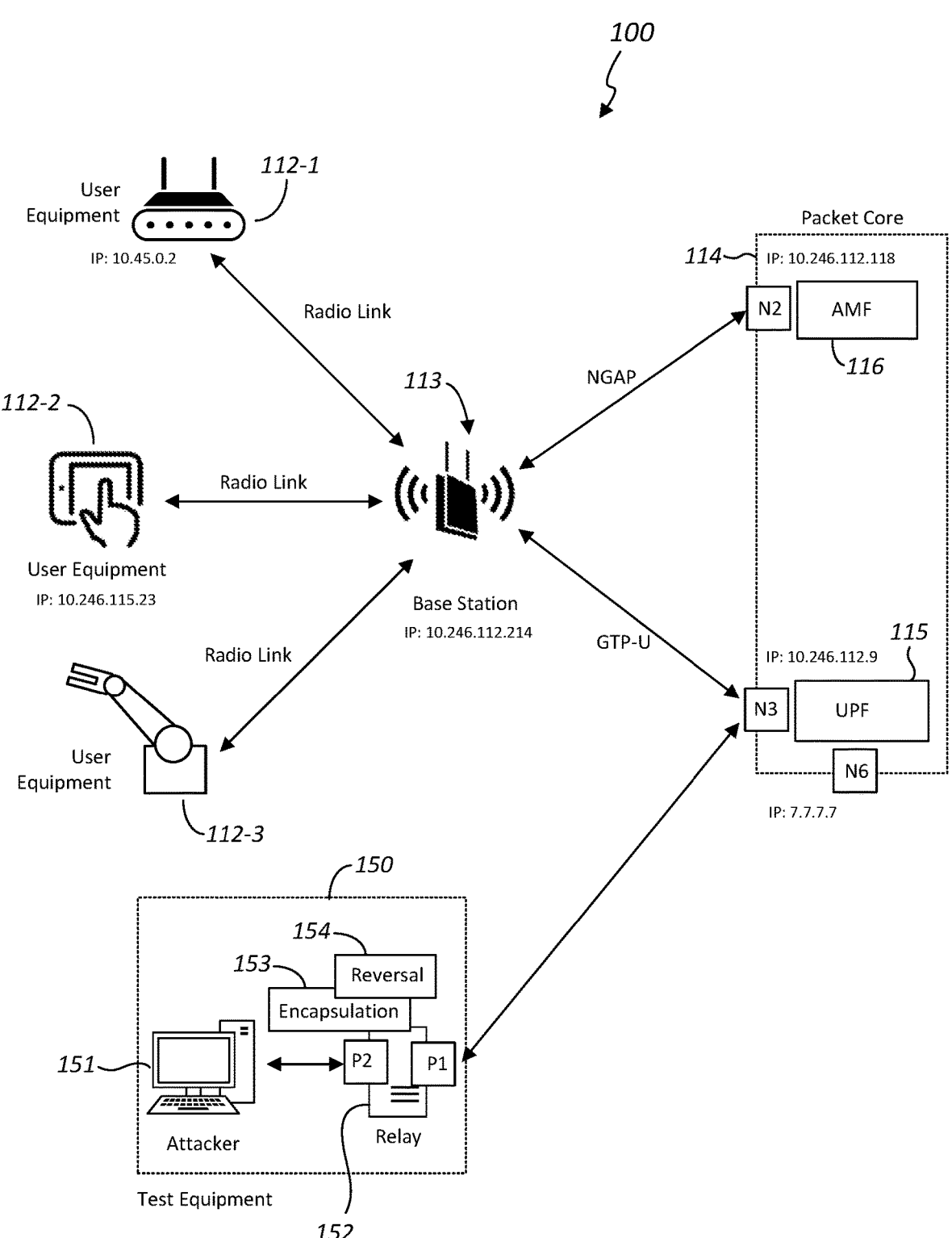
FIG. 1 shows a block diagram of a cellular network environment, in accordance with an embodiment of the present invention.

FIG. 1 shows a block diagram of a cellular network environment 100, in accordance with an embodiment of the present invention. The cellular network environment 100 comprises a plurality of user equipment 112 (i.e., 112-1, 112-2, 112-3, etc.) and a cellular network that comprises a base station 113 and a packet core 114. In one embodiment, the cellular network is a 5G network. As can be appreciated, embodiments of the present invention may be adapted, with some modifications, to other cellular networks, such as 3G and 4G networks.

In one embodiment, the cellular network environment 100 is private in that it is not accessible to the general public. The cellular network environment 100 may be that of a factory, private company, government facility, educational institution, etc. The plurality of user equipment 112 are connected to the cellular network by radio link to the base station 113. A user equipment 112 may be a smartphone, a customer premise equipment (CPE), an Internet of Things (IOT) device, an industrial robot, etc. that has cellular connectivity, either built-in or by way of a dongle. Generally, components of a cellular network environment that can send and receive data in accordance with the Internet Protocol (IP) have a corresponding IP address. In the example of FIG. 1, the IP address of the user equipment 112-1 is "10.45.0.2" and the IP address of the user equipment 112-2 is "10.246.115.23."

In one embodiment, the base station 113 and the packet core 114 are those of a conventional 5G network. The operation of a 5G network is well-known. Generally, the base station 113 is connected to the plurality of user equipment 112 by radio link, and is connected to the packet core 114 by way of a backhaul link, which is typically a wired IP network. In the example of FIG. 1, the IP address of the base station 113 is "10.246.112.214."

The packet core 114 has a control plane and a user plane. The user plane handles packets of user traffic, whereas the control plane handles signaling packets related to user equipment attachment, authentication, session establishment, and so on. The base station 113 sends control plane traffic to the Access and Mobility Management Function (AMF) 116, using the Next-Generation Application Protocol (NGAP) carried over Stream Control Transmission Protocol/Internet Protocol (SCTP/IP). The base station 113 sends user plane traffic to the User Plane Function (UPF) 115 by way of GTP-U tunnels. In the example of FIG. 1, the IP address of the N2 interface between the base station 113 and the AMF 116 is "10.246.112.118", the IP address of the N3 interface between the base station 113 and the UPF 115 is "10.246.112.9", and the IP address of the N6 interface between the UPF 115 and external networks is "7.7.7.7". The IP address of the UPF 115 between the UPF 115 and the base station 113 is the IP address of its associated N3 interface ("10.246.112.9" in this example), and the IP address of the UPF 115 between the UPF 115 and external networks is the IP address of its associated N6 interface ("7.7.7.7" in this example).

Figure 2:
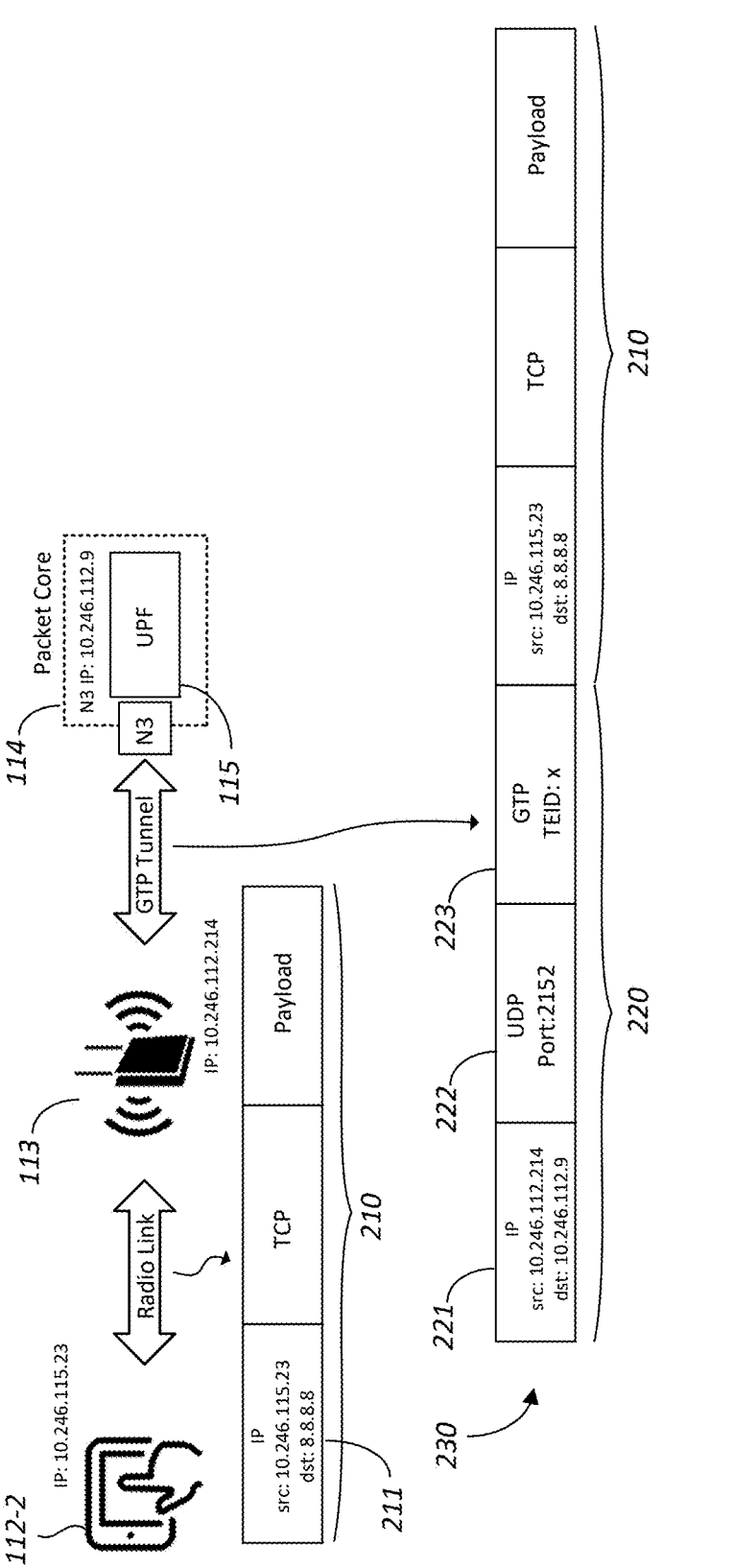
FIG. 2 graphically illustrates transmission of a packet from a user equipment to a User Plane Function of a cellular network in the cellular network environment of FIG. 1.

FIG. 2 graphically illustrates the transmission of a packet from the user equipment 112-2 to the UPF 115 in the cellular network environment 100 of FIG. 1. In the example of FIG. 2, the user equipment 112-2 sends a packet 210 to a destination computing device (not shown) that has connectivity to the UPF 115. The IP header of the packet 210 (see FIG. 2, 211) indicates a source IP address that is the IP address of the user equipment 112-2 (i.e., "10.246.115.23") and a destination IP address that is the IP address of the destination computing device (i.e., "8.8.8.8" in the example of FIG. 2). The base station 113 receives the packet 210 over a radio link and encapsulates the packet 210 in a GTP-U tunnel packet 230. A packet that is encapsulated within a GTP-U tunnel packet is also referred to herein as an "inner packet." In the example of FIG. 2, the packet 210 is an inner packet encapsulated in the GTP-U tunnel packet 230.

In the example of FIG. 2, the GTP-U tunnel packet 230 has a tunnel header 220 that includes an outer IP header 221, an outer UDP header 222, and a GTP header 223. The outer IP header 221 has a source IP address that indicates the IP address of the base station 113 (i.e., "10.246.112.214") and a destination IP address that indicates the IP address of the N3 interface associated with the UPF 115 (i.e., "10.246.112.9"); the outer UDP header 222 indicates a UDP port 2152; and the GTP header 223 indicates a Tunnel Endpoint Identifier (TEID) ("x", which is 4 bytes long).

On GTP-U nodes, such as the base station 113 and the UPF 115, the TEID distinguishes one tunnel from another. When the base station 113 receives a GTP-U tunnel packet, the base station 113 checks if the TEID is valid and, if the TEID is valid, decapsulates the GTP-U tunnel packet to extract the inner packet, and forwards the inner packet to its destination user equipment 112 through an appropriate radio link. Similarly, when the UPF 115 receives a GTP-U tunnel packet, the UPF 115 checks if the TEID is valid and, if the TEID is valid, decapsulates the GTP-U tunnel packet to extract the inner packet, and forwards the inner packet to its destination.

In the example of FIG. 2, the UPF 115 receives the GTP-U tunnel packet 230 from the base station 113 through the N3 interface. The TEID in the tunnel header 220 is valid in the example of FIG. 2. Accordingly, the UPF 115 decapsulates the GTP-U tunnel packet 230 to extract the packet 210, and forwards the packet 210 to its destination indicated in the destination IP address of the packet 210.

Referring back to FIG. 1, the cellular network environment 100 further includes a test equipment 150. The test equipment 150 comprises an attacker system referred to herein as an "attacker 151" and a relay system referred to herein as a "relay 152." The attacker 151 comprises a computer system that is configured to perform attacks on a user equipment 112 to test the user equipment 112 for vulnerabilities. The attacker 151 may comprise a conventional attacker system, such as a computer system that runs the Kali Linux penetration testing software. The attacker 151 may employ the Metasploit Framework attack tool to execute exploit code against a user equipment 112 that is being tested, which is also referred to herein as a "target user equipment". The default gateway of the attacker 151 is the relay 152. Advantageously, different attacker systems (with different attack tools or suites) may be employed to operate in conjunction with the relay 152 to perform penetration testing.

The relay 152 comprises a computer system that is configured to allow establishment of a two-way TCP connection between the attacker 151 and a target user equipment 112. That is, the relay 152 allows the attacker 151 to send and receive packets to and from the target user equipment 112 over a TCP connection. The relay 152 may have a first network interface port P1 and a second network interface port P2. The network interface port P1 faces the N3 interface associated with the UPF 115, and the network interface port P2 is connected to the attacker 151. The IP network between the network interface port P2 and the attacker 151 is private in that only the attacker 151 and the relay 152 are connected to that IP network. In one embodiment, the relay 152 runs the Linux operating system. The relay 152 and the attacker 151 may be implemented on separate computer hardware. The relay 152 and the attacker 151 may also be implemented as virtual machines running on the same computer hardware, in which case the relay 152 and the attacker 151 may have a bridged connection between them.

In the example of FIG. 1, the relay 152 runs an encapsulation program 153 and a reversal program 154. The encapsulation program 153 is configured to hook the network stack, and monitor all packets that are forwarded through the network stack. When the encapsulation program 153 identifies a packet originating from the attacker 151 and going to a target user equipment 112, the encapsulation program 112 changes the identified packet's source IP address to an IP address (e.g., IP address of the network interface port P1) that allows the relay 152 to receive a corresponding response packet originated by the target user equipment 112, recalculates the layer 3 and layer 4 checksums of the identified packet to reflect changes to the identified packet, and thereafter encapsulates the identified packet in a GTP-U tunnel packet. In the tunnel header of the GTP-U tunnel packet, the encapsulation program 153 sets the destination IP address in the outer IP header to the IP address of the N3 interface associated with the UPF 115, sets the source IP address in the outer IP header to the IP address of the network interface port P1, and sets the TEID in the GTP header to a downlink TEID associated with the target user equipment 112. The encapsulation program 153 thereafter transmits the GTP-U tunnel packet through the network interface port P1 toward the N3 interface associated with the UPF 115.

The reversal program 154 is configured to hook the network stack, and monitor all packets destined to the IP address of the network interface port P1. When the reversal program 154 identifies a packet originating from the target user equipment 112, the reversal program 154 changes the destination IP address of the identified packet to the IP address of the attacker 151, recalculates the layer 3 and layer 4 checksums of the identified packet to reflect changes to the identified packet, and thereafter transmits the identified packet to the attacker 151 through the network interface port P2. In embodiments where network address translation is performed on packets originating from the target user equipment, the reversal program 154 further changes the source IP address of the identified packet to the IP address of the target user equipment.

Figure 3:
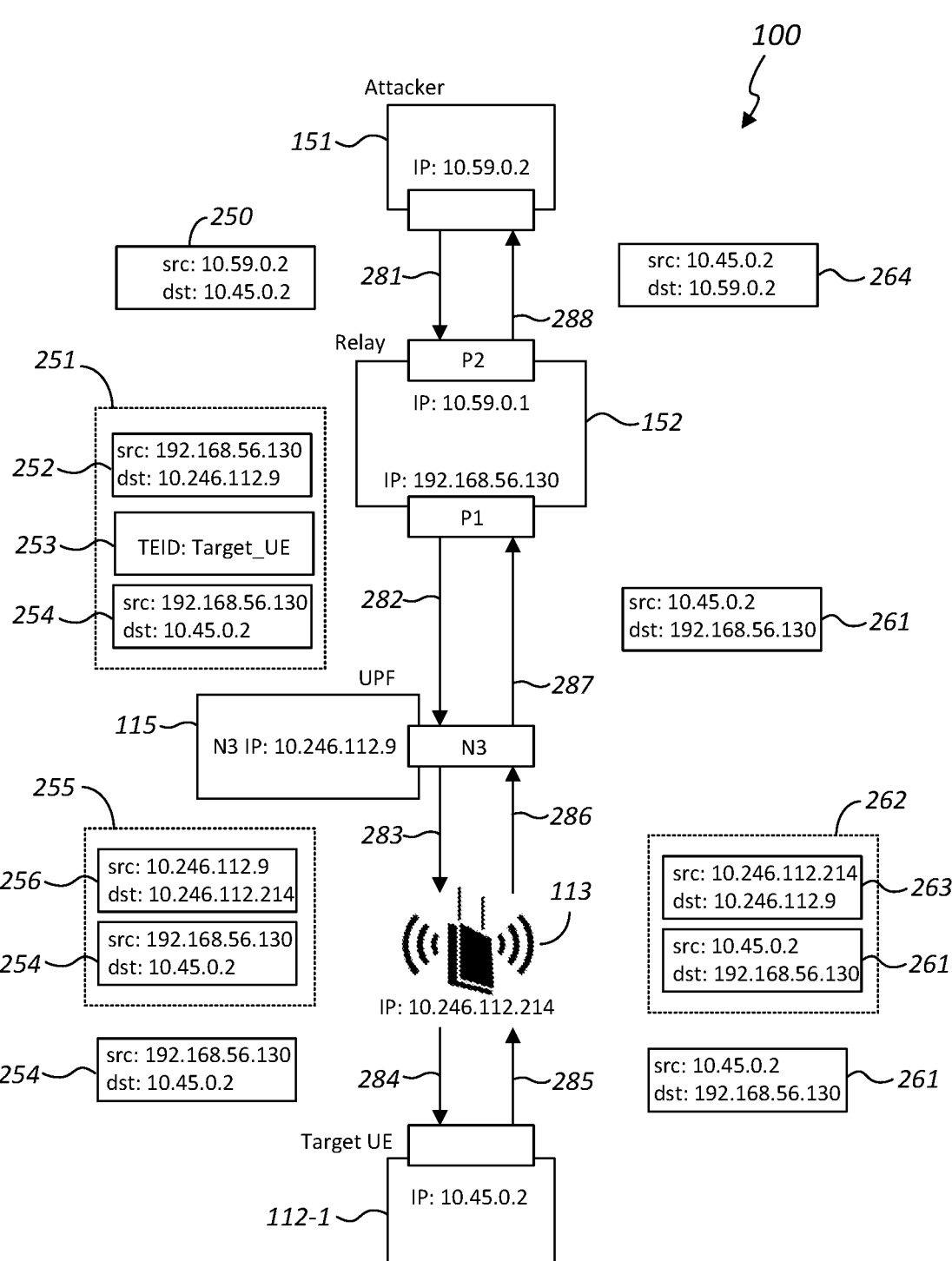
FIG. 3 shows a flow diagram of an example penetration testing of the cellular network environment of FIG. 1, in accordance with an embodiment of the present invention.

FIG. 3 shows a flow diagram of an example penetration testing of the cellular network environment 100, in accordance with an embodiment of the present invention. It is to be noted that the IP address of a target user equipment 112 and the IP address of the N3 interface associated with the target user equipment 112 are assumed to be known before the penetration testing is performed. This assumption is not unreasonable because internal IP addresses are not normally considered secrets, and the IP address of the N3 interface may be found by GTP-U scanning. It is to be further noted that the port numbers of inner packets are not indicated in the following examples. This is because the port numbers depend on the specific attack performed by the attacker 151.

Generally, a downlink TEID ("TEID_UE") that belongs to an IP address of a user equipment may be found by brute forcing. For example, GTP-U messages with arbitrary TEID values may be sent to a GTP-U node. If the TEID is invalid, the GTP-U node responds with a GTP-C error message; if no error message is received, the TEID is presumed to be valid. For a wide range of possible TEID values, this brute forcing method may be too slow. Furthermore, the GTP-U node may silently drop invalid TEID messages without sending an error message.

A more efficient brute forcing method uses an ICMP echo (ping). In this method, the relay 152 starts by creating a listening thread, which listens to a raw socket for ICMP messages. Then, the relay 152 creates a sending thread that sends out GTP-U tunneled ICMP requests in a loop to the UPF 115 (by way of the N3 interface) where: (a) the loop counter is the TEID range; (b) the destination IP address of the ICMP packet is the IP address of the target user equipment 112; and the source IP address of the ICMP packet is the IP address of the network interface port P1 of the relay 152. The ICMP ID of each ICMP request is the first 16 bits of the loop-counter. The payload of each ICMP request is the loop counter. Usually, when network nodes reply to ICMP echo-requests, the network nodes copy the request payload in the replies, but this is not mandatory. If and when an ICMP echo-reply is received by the listening thread, the payload is extracted to find its corresponding TEID. If the payload is empty, the ICMP ID is used to find the first 16 bits of the TEID and brute forcing is performed again for the next 16 bits. This multi-thread asynchronous ICMP transmit/receive allows for simpler, faster, and more reliable brute-forcing. Because transmission and reception are asynchronous, the transmission and reception can be run from different physical machines, for example transmission from the relay 152 and reception in a remote relay (e.g., see FIG. 5, remote relay 550).

Another way to speed up brute-forcing is to try known TEID ranges first, taking advantage of some vendors' and devices' affinity to use particular TEID ranges.

In the example of FIG. 3, prior to the penetration testing, the relay 152 runs a brute force TEID enumeration program to find a downlink TEID ("TEID_UE") that belongs to the IP address of the target user equipment 112-1. The penetration testing begins thereafter, with the attacker 151 transmitting a request packet that is intended for the target user equipment 112-1 (see arrow 281). The request packet, which is labeled as a packet 250, has a source IP address that indicates the IP address of the attacker 151 (i.e., "10.59.0.2") and a destination IP address that indicates the IP address of the target user equipment 112-1 (i.e., "10.45.0.2"). The attacker 151 transmits the request packet, using its attack tool, to the default gateway of the attacker 151, which is the relay 152 in this example.

The relay 152, running the encapsulation program 153 (shown in FIG. 1), receives the request packet and changes the source IP address of the request packet to an IP address of the network interface port P1 of the relay 152. The request packet, as modified by the relay 152, is relabeled as a packet 254 in the example of FIG. 3. The source IP address of the packet 254 is the IP address of the network interface port P1 (i.e., "192.168.56.130") and the destination IP address of the packet 254 is the IP address of the target user equipment 112-1. The layer 3 and layer 4 checksums of the packet 254 are recalculated to reflect the changes. The relay 152 encapsulates the packet 254 in a GTP-U tunnel packet 251. The outer IP header 252 of the GTP-U tunnel packet 251 has a source IP address that is set to the IP address of the network interface port P1 and a destination IP address that is set to the IP address of the N3 interface associated with the UPF 115 (i.e., "10.246.112.9"). The GTP header 253 of the GTP-U tunnel packet 251 has a TEID that is set to the downlink TEID ("TEID_UE") that belongs to the IP address of the target user equipment 112-1. The relay 152 thereafter transmits the GTP-U tunnel packet 251 through the network interface port P1 to the N3 interface associated with the UPF 115 (see arrow 282).

The UPF 115 receives the GTP-U tunnel packet 251, decapsulates the GTP-U tunnel packet 251 to extract the packet 254, and re-encapsulates the packet 254 in a GTP-U tunnel packet 255. The outer IP header 256 of the GTP-U tunnel packet 255 has a source IP address that is set to the IP address of the N3 interface associated with the UPF 115, and a destination IP address that is set to the IP address of the base station 113 (i.e., "10.246.112.214"). The UPF 115 thereafter transmits the GTP-U tunnel packet 255 to the base station 113 (see arrow 283). The TEID in the GTP-U tunnel packet 255 is the downlink TEID of the target user equipment 112-1, as in the GTP-U tunnel packet 251.

The base station 113 receives the GTP-U tunnel packet 255, decapsulates the GTP-U tunnel packet 255 to extract the packet 254, and forwards the packet 254 to its destination IP address, which is the target user equipment 112-1 (see arrow 284).

The target user equipment 112-1 receives the packet 254 and sends a response packet in response. As can be appreciated, the packet 254 is the request packet from the attacker 151 with changes to its source IP address to allow the response packet to be received by the relay 152. That is, the response packet is responsive to the request packet sent by the attacker 151.

The target user equipment 112-1 sends the response packet, which is labeled as a packet 261 in the example of FIG. 3, to the IP address indicated in the source IP address of the packet 254. More particularly, the packet 261 has a source IP address that is set to the IP address of the target user equipment 112-1, and a destination IP address that is set to the IP address of the network interface port P1 of the relay 152. The target user equipment 112-1 transmits the packet 261 to the base station 113 (see arrow 285).

The base station 113 encapsulates the packet 261 in a GTP-U tunnel packet 262. The outer IP header 263 of the GTP-U tunnel packet 262 has a source IP address that is set to the IP address of the base station 113, and a destination IP address that is set to the IP address of the N3 interface associated with the UPF 115. The base station 113 transmits the GTP-U tunnel packet 262 to the N3 interface associated with the UPF 115 (see arrow 286). The TEID in the GTP-U tunnel packet 262 is an uplink TEID that belongs to the IP address of the target user equipment 112-1.

The UPF 115 receives the GTP-U tunnel packet 262, decapsulates the GTP-U tunnel packet 262 to extract the packet 261, and forwards the packet 261 to the IP address indicated in the destination IP address of the packet 261, which is the IP address of the network interface port P1 of the relay 152 (see arrow 287).

The relay 152, running the reversal program 154 (shown in FIG. 1), changes the destination IP address of the packet 261 to the IP address of the attacker 151 before forwarding the packet 261 to the attacker 151. More particularly, the relay 152 changes the packet 261 to a packet 264. The packet 264 has a source IP address that is set to the IP address of the target user equipment 112-1, a destination IP address that is set to the IP address of the attacker 151, and layer 3 and layer 4 checksums that have been recalculated to reflect the changes.

The relay 152 transmits the packet 264 through the network interface port P2 to the attacker 151 (see arrow 288). As can be appreciated, the packet 264 as received by the attacker 151 is the response packet from the target user equipment 112-1 with changes to its destination IP address to reflect the IP address of the attacker 151.

It is to be noted that the packet 254 received by the target user equipment 112-1 is essentially the request packet initially sent by the attacker 151; the request packet (see packet 250) and packet 254 only differ in their source IP addresses. Similarly, the packet 264 received by the attacker 151 is essentially the response packet (see packet 261) sent by the target user equipment 112-1 in response to the packet 254; the response packet (see packet 261) and the packet 264 only differ in their destination IP addresses. That is, the attacker 151 is able to send a request packet to the target user equipment 112-1, and receive a response packet that is responsive to the request packet from the target user equipment 112-1. Accordingly, a two-way TCP connection may be established between the attacker 151 and the target user equipment 112-1 using the method of FIG. 3. More particularly, the attacker 151 and the user equipment 112-1 may establish a TCP connection and communicate over the TCP connection by exchanging packets in accordance with the method of FIG. 3. This allows the attacker 151 to attack the target equipment 112-1 through the cellular network as part of the penetration testing.

Figure 4:
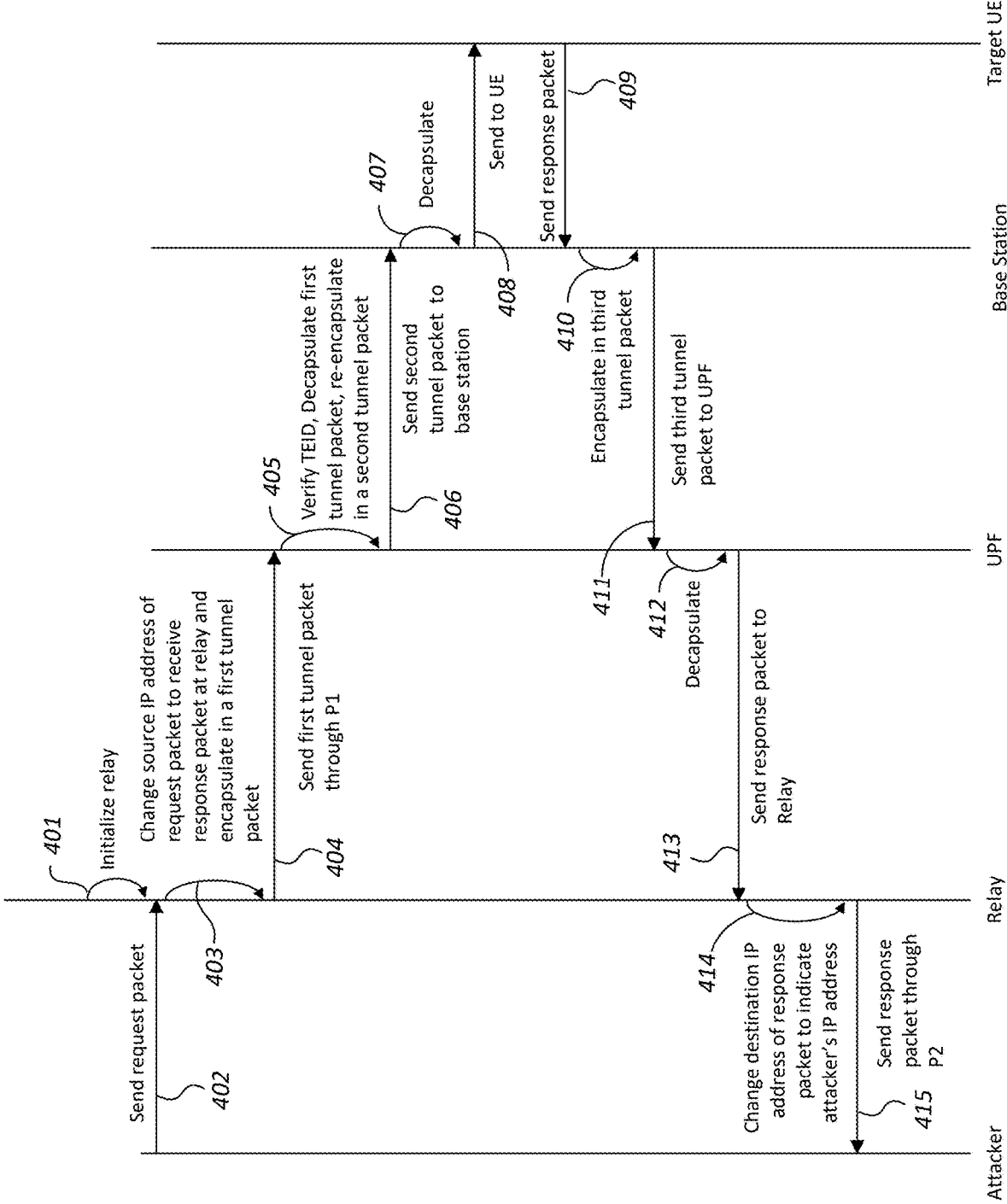
FIG. 4 shows a call diagram of a method of performing penetration testing on a cellular network environment, in accordance with an embodiment of the present invention.

FIG. 4 shows a call diagram of a method of performing penetration testing on a cellular network environment, in accordance with an embodiment of the present invention. The method of FIG. 4 may be performed using previously described components. As can be appreciated, other components may also be employed to be perform the method of FIG. 4 without detracting from the merits of the present invention.

In the example of FIG. 4, the relay 152 initializes prior to starting the penetration testing (see arrow 401). During initialization, the relay (e.g., relay 152) creates a first raw socket (SockP1) for sending packets through a first network interface port (e.g., network interface port P1), creates a second raw socket (SockP2) for sending packets through a second network interface port (e.g., network interface port P2), hooks the network stack, and monitors packets going through the network stack.

In one embodiment, in the LINUX operating system, for request packets going from an attacker (e.g., attacker 151) to a target user equipment (e.g., target user equipment 112), the relay binds a call-back function to netfilter-queue-num X, creates an NFQUEUE rule in FORWARD chain to send packets from the attacker going to the target user equipment, to queue-num X. For response packets from the target user equipment to the attacker, the relay binds a call-back function to netfilter-queue-num Y, creates an NFQUEUE rule in INPUT chain to send packets from the target user equipment going to the first network interface port, to queue-num Y.

The penetration testing begins with an attacker (e.g., attacker 151) sending a request packet (see arrow 402) that is addressed to the target user equipment (e.g., a user equipment 112 being tested).

The relay receives the request packet at the second network interface port, modifies the request packet, and encapsulates the modified request packet in a first GTP-U tunnel packet (see arrow 403). The relay modifies the request packet by changing the source IP address of the request packet to an IP address that allows a corresponding response packet from the target user equipment to be received at the relay.

When the relay sees the request packet originating from the attacker to the target user equipment, the relay modifies the request packet by changing the source IP address of the request packet to the IP address of a first network interface (e.g., network interface port P1) of the relay, and recalculating the layer 3 and layer 4 checksums of the modified request packet. The relay encapsulates the modified request packet in a first GTP-U tunnel packet. The outer IP header of the first GTP-U tunnel packet has a destination IP address that is set to the IP address of the N3 interface associated with the UPF (e.g., UPF 115), and has a source IP address that is set to the IP address of the first network interface port. The TEID in the GTP header of the first GTP-U tunnel packet is a downlink TEID that belongs to the IP address of the target user equipment. The relay sends the first GTP-U tunnel packet through the first network interface port through the socket (SockP1) created during initialization (see arrow 404).

The UPF receives the first GTP-U tunnel packet from its associated N3 interface, verifies that the TEID in the GTP header is valid (which is the case this example), decapsulates the first GTP-U tunnel packet to extract the modified request packet, and re-encapsulates the modified request packet in a second GTP-U tunnel packet (see arrow 405). The UPF thereafter transmits the second GTP-U tunnel packet to the base station by way of the N3 interface associated with UPF (see arrow 406).

The base station receives the second GTP-U tunnel packet and decapsulates the second GTP-U tunnel packet to extract the modified request packet (see arrow 407). The base station thereafter transmits the modified request packet to the target user equipment (see arrow 408).

The target user equipment receives the modified request packet and, in response, transmits a response packet that is addressed to the source IP address indicated in the modified request packet, i.e., the IP address of the network interface port P1 (see arrow 409).

The base station receives the response packet, and encapsulates the response packet in a third GTP-U tunnel packet (see arrow 410). The base station transmits the third GTP-U tunnel packet to the UPF (see arrow 411).

The UPF receives the third GTP-U tunnel packet by way of the N3 interface associated with the UPF. The UPF decapsulates the third GTP-U tunnel packet to extract the response packet (see arrow 412) and transmits the response packet to the first network interface port of the relay (see arrow 413), as per the destination IP address of the response packet.

The relay receives the response packet at the first network interface port, and modifies the response packet to indicate the attacker as the destination of the response packet (see arrow 414). More particularly, when the relay sees the response packet originating from the target user equipment and going to the first network interface port, the relay modifies the response packet by setting the destination IP address of the response packet to the IP address of the attacker, and recalculating the layer 3 and layer 4 checksums of the modified response packet. In embodiments where network address translation is performed on the response packet along the way, the relay further modifies the response packet by setting the source IP address of the response packet to the IP address of the target user equipment. The relay sends the modified response packet through the second network interface port by way of the second raw socket (SockP2) created during initialization (see arrow 415).

As can be appreciated, embodiments of the present invention may be adjusted to meet the needs of a particular cellular network environment. For example, in some network environments, the UPF may deliver response packets only through the N6 interface, and the network interface port P1 of the relay may not be reachable from the N6 interface. In that case, the cellular network environment may include a remote relay that is deployed in a communication network that is reachable from the N6 interface as now described with reference to FIG. 5.

Figure 5:
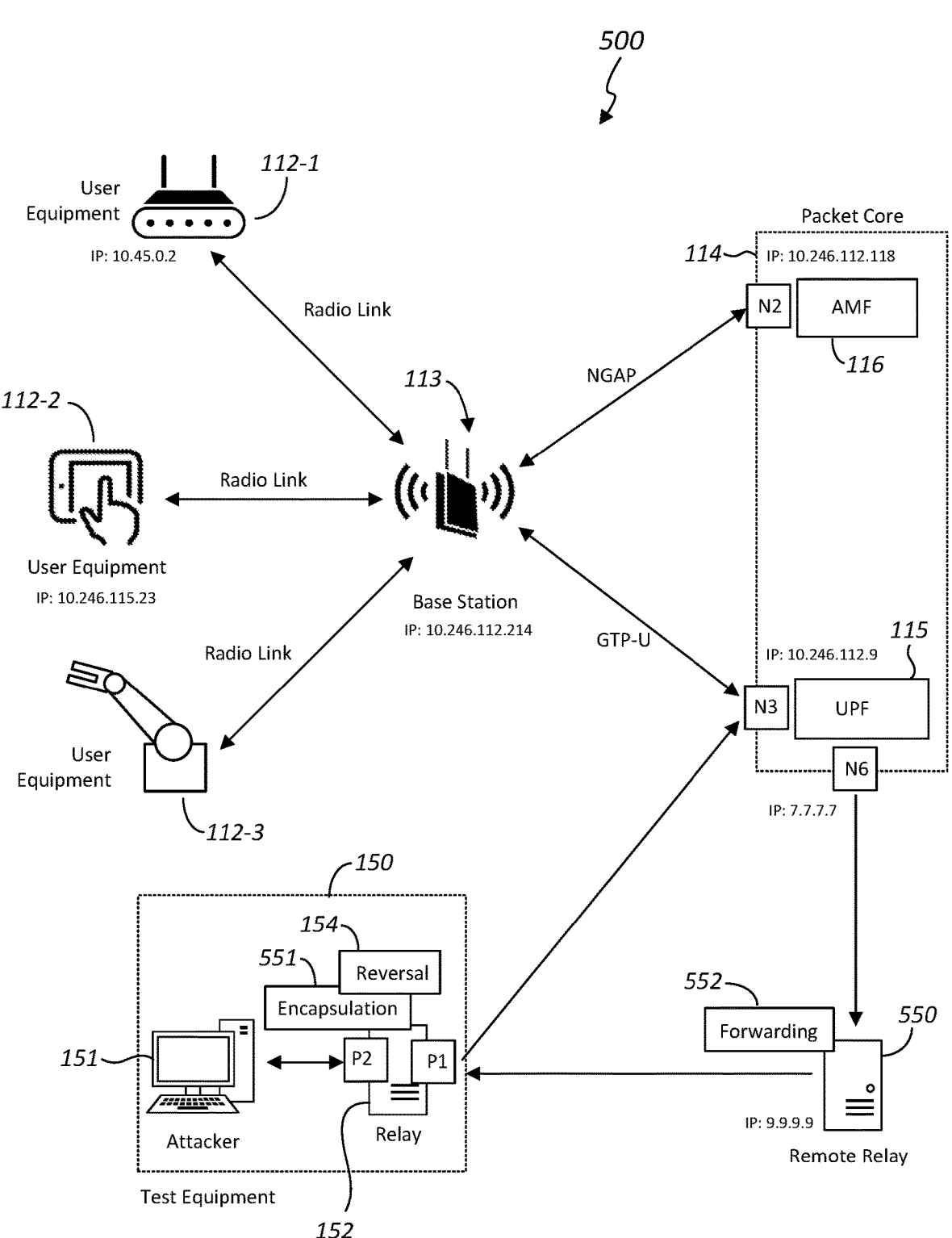
FIG. 5 shows a block diagram of a cellular network environment, in accordance with an embodiment of the present invention.

FIG. 5 shows a block diagram of a cellular network environment 500, in accordance with an embodiment of the present invention. In the cellular network environment 500, the UPF 115 delivers response packets only through the N6 interface and the network interface port P1 of the relay 150 is not reachable from the N6 interface. A remote relay system, which is referred to as a remote relay 550, is deployed to connect to the N6 interface and the network interface port P1. The remote relay 550 is a computer system that is configured to receive response packets, and forward the response packets to the relay 152. The cellular network environments 500 and 100 are otherwise the same except as explained below.

In the cellular network environment 500, the relay 152 runs an encapsulation program 551 and the previously explained reversal program 154. The encapsulation program 551 is the same as the encapsulation program 153 (shown in FIG. 1), except that it modifies the request packet transmitted by the attacker 151 to have a source IP address of the remote relay 550 instead of that of the network interface port P1. This allows a response packets that is responsive to the request packet to be forwarded to the remote relay 550 instead of to the network interface port P1. The reversal program 154 operates as in the cellular network environment 100, except that it receives response packets from the remote relay 550 instead of the N3 interface associated with the UPF 115. The remote relay 550 has an IP address of "9.9.9.9" in the example of FIG. 5.

The remote relay 550 runs a forwarding program 552 that is configured to receive a response packet from the N6 interface associated with the UPF 115, and forward the response packet to the network interface port P1 of the relay 152.

During initialization, the remote relay 550 creates a raw socket (SockP3) for sending packets, hooks to the network stack, and monitors for packets that are coming in and has a destination IP address of the network interface port of the remote relay 550. In the LINUX operating system, the remote relay 550 binds a call-back function to netfilter-queue-num Y, and creates an NFQUEUE rule in INPUT chain to send packets from a target user equipment 112 to the network interface port of the remote relay 550, to queue-num Y. When the remote relay 550 sees a response packet originating from the target user equipment 112 and coming to the network interface port of the remote relay 550, the remote relay 550 (as programmed with the forwarding program 552), modifies the response packet by changing the destination IP address of the response packet to the IP address of the network interface port P1 of the relay 152, and recalculates the layer 3 and layer 4 checksums of the modified response packet. The remote relay 550 thereafter sends the modified response packet to the network interface port P1 of the relay 152 by way of the raw socket (SockP3) created earlier. The relay 152, running the reversal program 154, modifies the response packet from the remote relay 550 as before, and thereafter sends the response packet through the network interface port P2 to the attacker 151.

Figure 6:
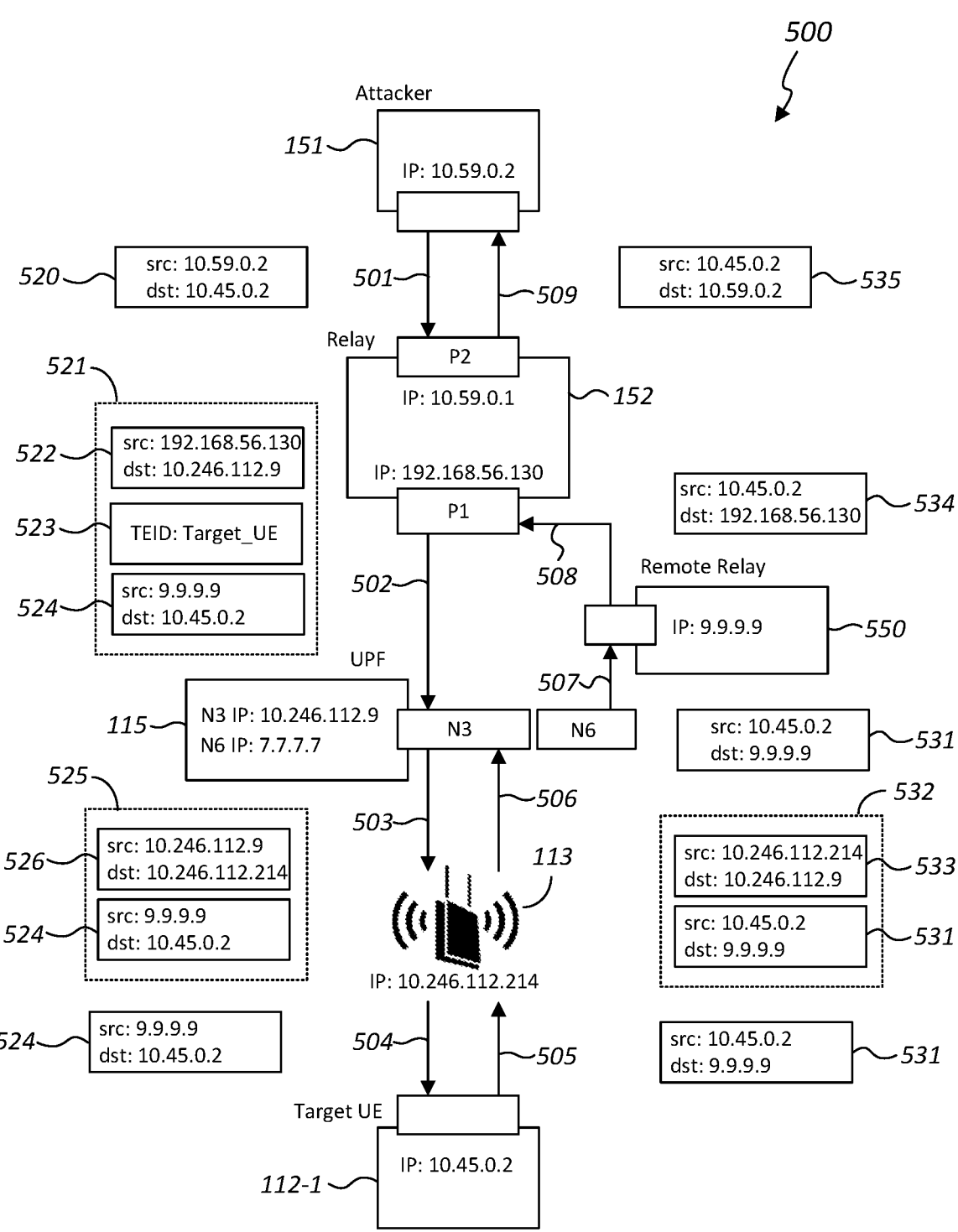
FIG. 6 shows a flow diagram of an example penetration testing of the cellular network environment of FIG. 5, in accordance with an embodiment of the present invention.

FIG. 6 shows a flow diagram of an example penetration testing of the cellular network environment 500, in accordance with an embodiment of the present invention. The IP address of the target user equipment 112-1 and the IP address of the N3 interface are assumed to be known before the penetration testing is performed.

In the example of FIG. 6, prior to the penetration testing, the relay 152 runs a brute force TEID enumeration program to find a downlink TEID ("TEID_UE") that belongs to the IP address of the target user equipment 112-1. The penetration testing begins thereafter, with the attacker 151 transmitting a request packet that is intended for the target user equipment 112-1 (see arrow 501). The request packet, which is labeled as a packet 520, has a source IP address that is set to the IP address of the attacker 151 (i.e., "10.59.0.2"), and a destination IP address that is set to the IP address of the target user equipment 112-1 (i.e., "10.45.0.2"). The attacker 151 transmits the request packet, using its attack tool, to the default gateway of the attacker 151, which is the relay 152 in this example.

The relay 152, running the encapsulation program 551 (shown in FIG. 5), receives the request packet and changes the source IP address of the request packet to the IP address of the remote relay 550 (i.e., "9.9.9.9"), so that the response packet from the target user equipment 112-1 is forwarded to the relay 152 by way of the remote relay 550.

The request packet, as modified by the relay 152, is relabeled as a packet 524 in the example of FIG. 6. The source IP address of the packet 524 is the IP address of the remote relay 550, and the destination IP address of the packet 524 is the IP address of the target user equipment 112-1. The layer 3 and layer 4 checksums of the packet 524 have been recalculated to reflect the changes. The relay 152 encapsulates the packet 524 in a GTP-U tunnel packet 521.

The outer IP header 522 of the GTP-U tunnel packet 251 has a source IP address that is set to the IP address of the network interface port P1 and a destination IP address that is set to the IP address of the N3 interface associated with the UPF 115 (i.e., "10.246.112.9"). The GTP header 523 of the GTP-U tunnel packet 521 has a TEID that is set to the downlink TEID ("TEID_UE") that belongs to the IP address of the user equipment 112-1. The relay 152 thereafter transmits the GTP-U tunnel packet 521 through the network interface port P1 to the N3 interface associated with the UPF 115 (see arrow 502).

The UPF 115 receives the GTP-U tunnel packet 521, decapsulates the GTP-U tunnel packet 521 to extract the packet 524, and re-encapsulates the packet 524 in a GTP-U tunnel packet 525. The outer IP header 526 of the GTP-U tunnel packet 525 has a source IP address that is set to the IP address of the N3 interface associated with the UPF 115, and a destination IP address that is set to the IP address of the base station 113 (i.e., "10.246.112.214"). The UPF 115 thereafter transmits the GTP-U tunnel packet 525 to the base station 113 (see arrow 503). The TEID in the GTP-U tunnel packet 525 is the downlink TEID of the target user equipment 112-1, as in the GTP-U tunnel packet 521.

The base station 113 receives the GTP-U tunnel packet 525, decapsulates the GTP-U tunnel packet 525 to extract the packet 524, and forwards the packet 524 to its destination IP address, which is the target user equipment 112-1 (see arrow 504).

The target user equipment 112-1 receives the packet 524, and sends a response packet in response. The response packet is labeled as a packet 531 in the example of FIG. 6. The packet 531 has a source IP address that is set to the IP address of the target user equipment 112-1, and a destination IP address that is set to the IP address of the remote relay 550. The target user equipment 112-1 transmits the packet 531 to the base station 113 (see arrow 505).

The base station 113 encapsulates the packet 531 in a GTP-U tunnel packet 532. The outer IP header 533 of the GTP-U tunnel packet 532 has a source IP address that is set to the IP address of the base station 113, and a destination IP address that is set to the IP address of the N3 interface associated with the UPF 115. The base station 113 transmits the GTP-U tunnel packet 532 to the N3 interface associated with the UPF 115 (see arrow 506). The TEID in the GTP-U tunnel packet 532 is an uplink TEID that belongs to the IP address of the target user equipment 112-1

The UPF 115 receives the GTP-U tunnel packet 532, and decapsulates the GTP-U tunnel packet 532 to extract the packet 531. The UPF 115 forwards, through the N6 interface, the packet 531 to the IP address indicated in the destination IP address of the packet 531, which is the IP address of the remote relay 550 (see arrow 507).

The remote relay 550, running the forwarding program 552 (shown in FIG. 5), receives the packet 531 and modifies the packet 531 to the packet 534. The packet 534 has a source IP address that is set to the IP address of the target user equipment 112-1, and a destination IP address that is set to the IP address of the network interface port P1 of the relay 152. The layer 3 and layer 4 checksums of the packet 534 have been recalculated to reflect the modifications. The remote relay 550 thereafter forwards the packet 534 to the network interface port P1 of the relay 152 (see arrow 508).

The relay 152 receives the packet 534 at the network interface port P1. The relay 152, running the reversal program 154, modifies the packet 534 by changing its destination IP address to the IP address of the attacker 151. The packet 534 is relabeled as packet 535 in the example of FIG.

6. The packet 535 has a source IP address that is set to the IP address of the of the target user equipment 112-1, a destination IP address that is set to the IP address of the attacker 151, and layer 3 and layer 4 checksums that have been recalculated to reflect the modifications. The relay 152 thereafter transmits the packet 534 through the network interface port P2 to the attacker 151 (see arrow 509). As in the example of FIG. 3, the attacker 151 is able to send a request packet (packet 520) to and receive a response packet (packet 535) from the target user equipment 112-1.

In variations of the cellular network environment 500, network address translation (NAT) and stateful firewall may be performed by a NAT gateway in the cellular network environment 500. In a first variation of the cellular network environment 500, the N3 interface and the relay 152 are in a private subnet and behind the NAT gateway. To traverse the NAT gateway between the relay 152 and the remote relay 550, the relay 152 and the remote relay 550 may establish a tunnel, which in one embodiment is a GTP-U tunnel, between them.

The establishment of the GTP-U tunnel is initiated by the relay 152 so that the NAT gateway makes a corresponding entry in its translation table. More particularly, during initialization, the relay 152 creates a raw socket for sending and receiving GTP-U tunnel packets to and from the remote relay 550, and sends a GTP-U tunnel echo to the remote relay 550 to inform the remote relay 550 of the translated (by the NAT gateway) IP address of the network interface port P1. The source and destination ports of the GTP-U tunnel between the relay 152 and the remote relay 550 may be any pre-agreed ports, including the GTP-U standard port 2151. The TEID in GTP-U tunnel packets may be ignored.

Similarly, during initialization of the remote relay 550, the remote relay 550 creates a raw socket for sending and receiving GTP-U tunnel packets to and from the relay 152, receives the GTP-U tunnel echo from the relay 152, and notes the source IP address of the GTP-U tunnel echo as the IP address of the network interface port of the relay 152 that faces the remote relay 550.

When the remote relay 550 receives a response packet from the UPF 115, the remote relay 550 operates as before, but before forwarding the response packet to the relay 152, the remote relay 550 encapsulates the response packet in a GTP-U tunnel packet for transmission to the relay 152; the outer IP header of the GTP-U tunnel packet has a destination IP address that has been learned from the GTP-U tunnel echo.

The relay 152 receives and decapsulates the GTP-U tunnel packet sent by the remote relay 550, extracts the response packet from the GTP-U tunnel packet, and forwards the response packet to the attacker 151 as before. In general, the procedure is similar to that in the cellular network environment 500 except for the tunnel between the relay 152 and the remote relay 550.

In a second variation of the cellular network environment 500, the N3 interface and the relay 152 are in a private subnet and behind the NAT gateway, and the NAT gateway is also between the remote relay 550 and the N6 interface. In this second variation, the remote relay 550 forwards the response packet to the relay 152 in a GTP-U tunnel as described above. When the response packet reaches the relay 152, the reversal program 154 running in the relay 152 modifies the response packet by changing the destination IP address of the response packet to the IP address of the attacker 151 and changing the source IP address of the response packet to the IP address of the target user equipment 112 before forwarding the response packet to the attacker 151. An example operation of the second variation of the cellular network environment 500 is illustrated with reference to FIG. 7.

Figure 7:
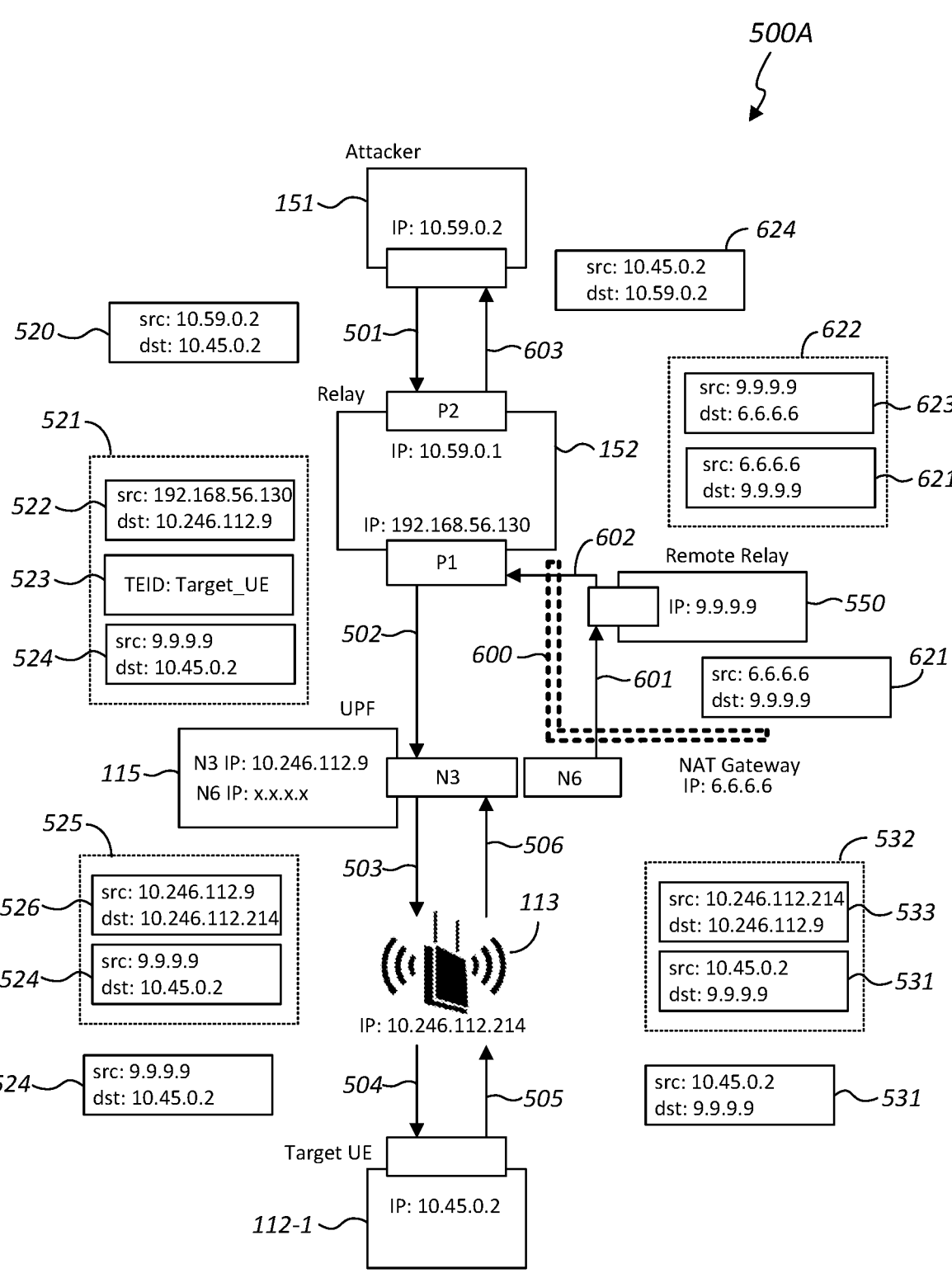
FIG. 7 shows a flow diagram of an example penetration testing of a variation of the cellular network environment of FIG. 5, in accordance with an embodiment of the present invention.

FIG. 7 shows a flow diagram of an example penetration testing of a cellular network environment 500A, in accordance with an embodiment of the present invention. The cellular network environment 500A is the same as the cellular network environment 500 as shown in FIG. 6, except for the addition of a NAT gateway 600 between the remote relay 550 and the N6 interface associated with the UPF 115, and between the remote relay 550 and the relay 152. In the example of FIG. 7, the NAT gateway 600 assigns an IP address of "6.6.6.6" to devices behind the NAT gateway 600. It is to be noted that NAT gateways usually do not change port numbers, unless there is a conflict.

The example of FIG. 7 is the same as the example of FIG. 6 up to the point where the UPF 115 receives the GTP-U tunnel packet 532 from the base station 113 (i.e., up to arrow 506). Thereafter, the UPF 115 decapsulates the GTP-U tunnel packet 532 to extract the packet 531, which is the response packet from the target user equipment 112-1. The UPF 115 forwards the packet 531, through the N6 interface to the NAT gateway 600, to the remote relay 550 as per the destination IP address of the packet 531. The NAT gateway 600 changes the source IP address of the packet 531 to reflect the IP address of the NAT gateway 600 (i.e., "6.6.6.6"), resulting in a packet 621. The NAT gateway forwards the packet 621 to the remote relay 550 (see arrow 601).

The remote relay 550 receives the packet 621, and encapsulates the packet 621 in a GTP-U tunnel packet 622. The GTP-U tunnel packet 622 has an outer IP header 623 that has a destination IP address set to the IP address of the network interface port P1 as translated by the NAT gateway 600 (i.e., "6.6.6.6"), and that has a source IP address set to the IP address of the remote relay 550 in the GTP-U tunnel (i.e., "9.9.9.9") between the remote relay 550 and the network interface port P1. The remote relay 550 thereafter transmits the GTP-U tunnel packet 622 to the network interface port P1 of the relay 152 by way of the NAT gateway 600 (see arrow 602).

The relay 152 receives the GTP-U tunnel packet 622 and decapsulates the GTP-U tunnel packet 622 to extract the packet 621. The relay 152, running the reversal program 154 (shown in FIG. 5), modifies the packet 621 to indicate that the destination of the packet 621 is the attacker 151 and that the source of the packet 621 is the target user equipment 112-1. More particularly, the relay 152, modifies the packet 621 to the packet 624, with the packet 624 having a destination IP address that is the IP address of the attacker 151 and a source IP address that is the IP address of the target user equipment 112-1. The relay 152 recalculates the layer 3 and layer 4 checksums of the packet 624 to reflect the changes, and thereafter forwards the packet 624 to the attacker 151 through the network interface port P2 (see arrow 603).

It is to be noted that in any of the above-described embodiments, the network interface port P1 of the relay 152 and the N3 interface associated with the UPF 115 do not necessarily have to be in the same subnet. Also, the N3 interface only needs to be reachable from the network interface port P1. The example IP addresses noted above do not need to be private IP addresses.

FIG. 8 shows a flow diagram of a method 700 of penetration testing a cellular network environment, in accordance with an embodiment of the present invention. The method 700 may be performed using previously described components. As can be appreciated, other components may also be employed to perform the method 700 without detracting from the merits of the present invention.

In step 701, an attacker system sends a request packet having a destination IP address of a target user equipment that is connected to a base station of a cellular network.

In step 702, a source IP address of the request packet is changed to an IP address for directing response packets to a relay system. For example, the relay system may be a default gateway of the attacker system. Sending the request packet from the attacker system results in the relay system receiving the request packet. The relay system modifies the source IP address of the request packet to the IP address for directing response packets to the relay system. The IP address for directing response packets to the relay system may be an IP address of a first network interface port of the relay system, an IP address of a remote relay system that forwards response packets to the relay system, or other IP address that allows response packets to be received at the relay system.

In step 703, after changing the source IP address of the request packet to the IP address for directing response packets to the relay system, the request packet is encapsulated in a GTP-U tunnel packet.

In step 704, to send the request packet to the target user equipment, the GTP-U tunnel packet is sent to a UPF of the cellular network, such as by addressing the GTP-U tunnel packet to an N3 interface that is associated with the UPF.

In step 705, a response packet is received at the relay system. The response packet is originated by the target user equipment in response to receiving the request packet, and is sent by the target user equipment by way of the base station and the UPF. The response packet may be received by the relay system from the UPF, or from a remote relay system that receives the response packet from the UPF and forwards the response packet to the relay system.

In step 706, after receiving the response packet at the relay system, the destination IP address of the response packet is changed to the IP address of the attacker system. In embodiments where network address translation is performed on the response packet along the way, step 706 further includes changing the source IP address of the response packet to the IP address of the target user equipment. In one embodiment, step 706 is performed at the relay system.

In step 707, after changing the destination IP address of the response packet to the IP address of the attacker system (and after changing the source IP address of the response packet to the IP address of the target user equipment in some embodiments), the response packet is sent to the attacker system. In one embodiment, the response packet is sent through a second network interface port of the relay system.

Figure 9:
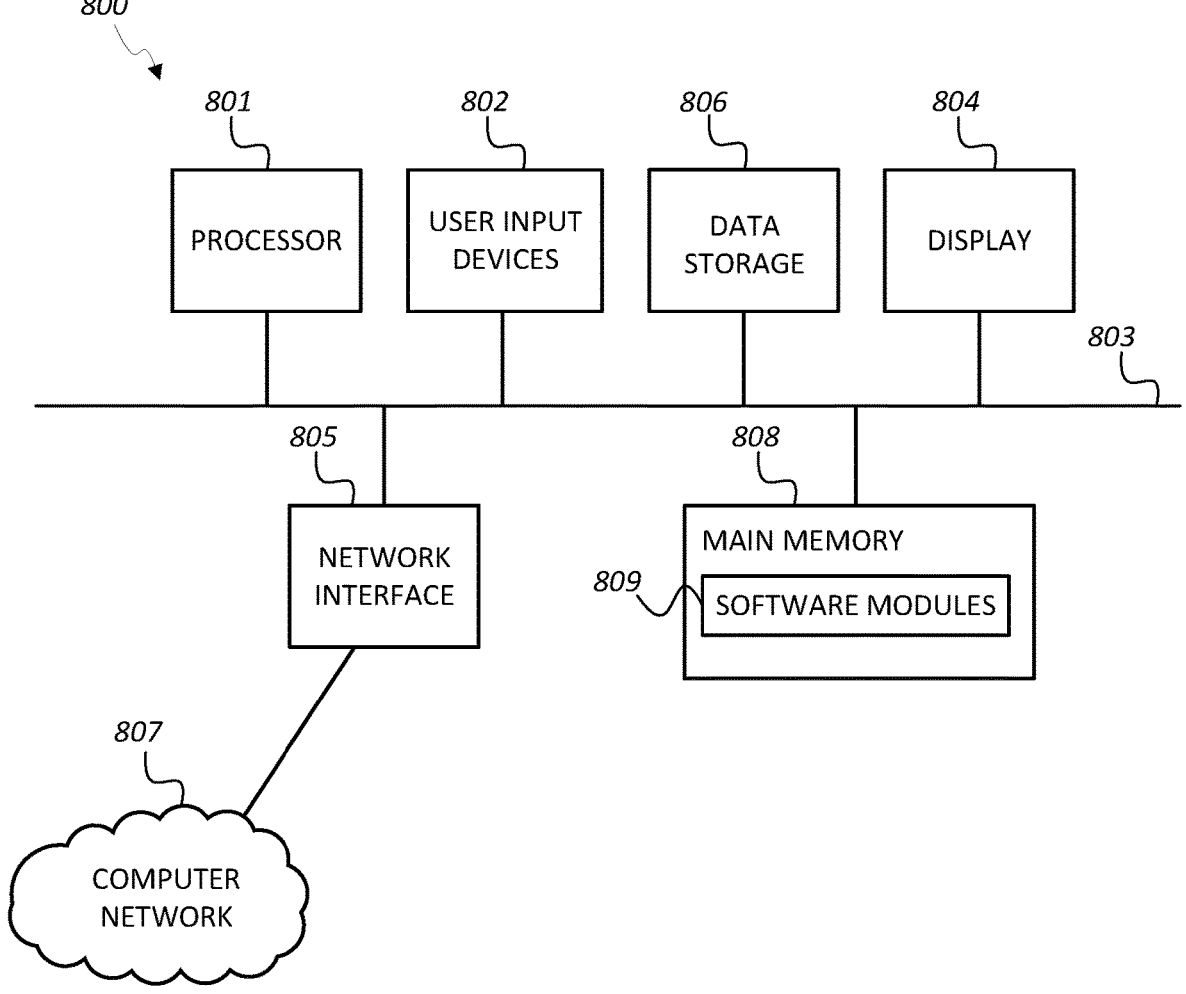
FIG. 9 shows a block diagram of a computer system that may be employed with embodiments of the present invention.

FIG. 9 shows a block diagram of a computer system 800 that may be employed with embodiments of the present invention. The computer system 800 may be employed as an attacker system, a relay system, a remote relay system, or other computer system described herein. The computer system 800 may have fewer or more components to meet the needs of a particular cybersecurity application. The computer system 800 may include one or more processors 801. The computer system 800 may have one or more buses 803 coupling its various components. The computer system 800 may include one or more user input devices 802 (e.g., keyboard, mouse), one or more data storage devices 806 (e.g., hard drive, optical disk, solid state drive), a display screen 804 (e.g., liquid crystal display, flat panel monitor), a computer network interface 805 (e.g., network adapter, modem), and a main memory 808 (e.g., random access memory). The computer network interface 805 may be coupled to a computer network 807, which in this example is an IP network.

The computer system 800 is a particular machine as programmed with one or more software modules 809, comprising instructions stored non-transitory in the main memory 808 for execution by at least one processor 801 to cause the computer system 800 to perform corresponding programmed steps. An article of manufacture may be embodied as computer-readable storage medium including instructions that when executed by at least one processor 801 cause the computer system 800 to be operable to perform the functions of the one or more software modules 809.

The software modules 809 may comprise instructions of an attack tool (e.g., Metasploit Framework attack tool) when the computer system 800 is employed as an attacker system, may comprise instructions of an encapsulation program and a reversal program when the computer system 800 is employed as a relay system, and may comprise instructions of a forwarding program when the computer system 800 is employed as a remote relay system.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of penetration testing a cellular network environment, the method comprising:

sending a request packet from an attacker system, the request packet having a destination Internet protocol (IP) address that is set to an IP address of a target user equipment that is connected to a base station of a cellular network;

receiving the request packet at a relay system;

after receiving the request packet at the relay system, changing a source IP address of the request packet to an IP address for directing response packets to the relay system and encapsulating the request packet in a General Packet Radio Services Tunneling Protocol User (GTP-U) tunnel packet;

sending the GTP-U tunnel packet to a User Plane Function (UPF) of the cellular network to send the request packet to the target user equipment;

receiving a response packet at the relay system, wherein the response packet is originated by the target user equipment in response to the request packet and is received at the relay system by way of the base station and the UPF of the cellular network;

after receiving the response packet at the relay system, changing a destination IP address of the response packet to the IP address of the attacker system; and after changing the destination IP address of the response packet to the IP address of the attacker system, sending the response packet to the attacker system.

2. The method of claim 1, wherein receiving the response packet at the relay system comprises:

receiving, by a remote relay system, the response packet from the UPF of the cellular network; and forwarding the response packet from the remote relay system to the relay system.

3. The method of claim 2, wherein the IP address for directing response packets to the relay system is an IP address of the remote relay system.

4. The method of claim 2, wherein the cellular network is a 5G network and the remote relay system receives the response packet from an N6 interface associated with the UPF of the cellular network.

5. The method of claim 2, wherein the remote relay system receives the response packet from the UPF of the cellular network by way of a network address translation (NAT) gateway.

6. The method of claim 1, further comprising:

determining a downlink Tunnel Endpoint Identifier (TEID) that belongs to the IP address of the target user equipment; and indicating the downlink TEID in the GTP-U tunnel packet.

7. The method of claim 1, wherein the IP address for directing response packets to the relay system is an IP address of a first network interface port of the relay system and wherein the response packet is sent to the attacker system through a second network interface port of the relay system.

8. A cellular network environment comprising:

a cellular network comprising a base station and a User Plane Function (UPF);

a target user equipment that is connected to the base station by a radio link; and a test equipment that is configured to perform penetration testing of the cellular network, the test equipment comprising an attacker system and a relay system, wherein the attacker system comprises at least one processor and a memory, the memory of the attacker system stores instructions that when executed by the at least one processor of the attacker system cause the attacker system to: send a request packet having a source Internet Protocol (IP) address that is set to an IP address of the target user equipment and receive a response packet that is originated by the target user equipment and is responsive to the request packet;

wherein the relay system has a first network interface port that faces toward the UPF and a second network interface port that is connected to the attacker system, the relay system comprises at least one processor and a memory, the memory of the relay system stores instructions that when executed by the at least one processor of the relay system cause the relay system to:

receive the request packet at the second network interface port;

after changing a source IP address of the request packet to an IP address for directing response packets to the relay system, encapsulate the request packet in a General Packet Radio Services Tunneling Protocol User (GTP-U) tunnel packet;

send the GTP-U tunnel packet to the UPF through the first network interface port;

receive the response packet by way of the UPF; and after changing a destination IP address of the response packet to an IP address of the attacker system, send the response packet to the attacker system through the second network interface port.

9. The cellular network environment of claim 8, wherein the cellular network is a 5G network and the IP address for directing response packets to the relay system is an IP address of a remote relay system that is connected to an N6 interface associated with the UPF.

10. The cellular network environment of claim 9, wherein the remote relay system comprises at least one processor and a memory, the memory of the remote relay system storing instructions that when executed by the at least one processor of the remote relay system cause the remote relay system to:

receive the response packet from the N6 interface associated with the UPF; and forward the response packet to the first network interface port of the relay system.

11. The cellular network environment of claim 10, wherein the remote relay system receives the response packet from the N6 interface through a network address translation (NAT) gateway.

12. The cellular network environment of claim 10, wherein the remote relay system forwards the response packet to the first network interface port of the relay system by way of a tunnel between the remote relay system and the first network interface port of the relay system.

13. The cellular network environment of claim 8, wherein the IP address for directing response packets to the relay system is an IP address of the first network interface port.

14. A method of performing penetration testing on a cellular network, the method comprising:

receiving a request packet from an attacker system, the request packet having a destination Internet Protocol (IP) address of a target user equipment that is connected to a base station of a cellular network;

after receiving the request packet from the attacker system, changing a source IP address of the request packet to a first IP address;

after changing the source IP address of the request packet to the first IP address, encapsulating the request packet in a General Packet Radio Services Tunneling Protocol User (GTP-U) tunnel packet;

sending the GTP-U tunnel packet to a User Plane Function (UPF) of the cellular network;

receiving a response packet that is responsive to the request packet, the response packet being originated by the target user equipment and is sent by way of the base station and the UPF;

changing a destination IP address of the response packet to an IP address of the attacker system; and after changing the destination IP address of the response packet to the IP address of the attacker system, forwarding the response packet to the attacker system.

15. The method of claim 14, wherein the cellular network is a 5G network, the GTP-U tunnel packet is sent to an N3 interface associated with the UPF, and the first IP address is an IP address of a network interface port that receives the request packet from an N6 interface associated with the UPF.

16. The method of claim 14, wherein the cellular network is a 5G network, the GTP-U tunnel packet is sent to an N3 interface associated with the UPF, and the first IP address is an IP address of a network interface port that receives the request packet from the N3 interface.

17. The method of claim 14, further comprising:

changing a source IP address of the response packet to the IP address of the target user equipment, wherein the response packet is forwarded to the attacker system after changing the destination IP address of the response packet to the IP address of the attacker system and after changing the source IP address of the response packet to the IP address of the target user equipment.

* * * * *